Aug. 31, 1954

C. S. GRIMSHAW 2,688,113

MOTOR CONTROLLING MEANS

Filed April 20, 1953

Inventor:
Charles S. Grimshaw,
by *Sheridan* *&* *Ross*
His Attorney.

Patented Aug. 31, 1954

2,688,113

UNITED STATES PATENT OFFICE 2,688,113

MOTOR CONTROLLING MEANS

Charles S. Grimshaw, Erie, Pa., assignor to General Electric Company, a corporation of New York Application April 20, 1953, Serial No. 349,769

15 Claims. (Cl. 318—221)

My invention relates to motor controlling means and pertains more particularly to means for controlling the motors of refrigerating units.

With refrigerating unit motors it is desirable to provide controlling means adapted for insuring that the starting windings of the motors will be energized during, and only during, starting periods and that the motors will be protected from overheating during running and stalled conditions.

Accordingly, the primary object of my invention is to provide new and improved thermal protective means for refrigerating unit motors.

Another object of my invention is to provide with a refrigerating unit motor new and improved motor starting and protecting means operative in accordance with the operation of the refrigerating unit.

Another object of my invention is to provide with a refrigerating unit motor including means for thermally protecting the motor, means for insuring maximum protection immediately upon commencement of a starting period.

Still another object of my invention is to provide a motor protective means which is simple, reliable in service and inexpensive and easy to manufacture.

Further objects and advantages of my invention will become apparent as the following description proceeds and the features of novelty which characterize my invention will be pointed out with particularity in the claims annexed to and forming part of this specification.

In carrying out the objects of my invention, I provide a bimetalic overload strip adapted for being connected in a current supply circuit to a refrigerating unit motor and responsive to a pair of resistance heaters. One of the heaters and a pair of starting contacts biased for closing are adapted for being connected in the starting winding circuit of the motor. The other heater and a coil are adapted for being connected in the running winding circuit of the motor. Cooperating with the starting contacts and the coil and biased for opening the starting contacts is an armature carrying a magnet. The magnet cooperates with a magnetic plunger in a cylinder adapted for being connected to the high pressure side of the unit. When the unit is idle, the plunger is so positioned that the magnet is attracted thereto and restrains the armature from opening the starting contacts. When the unit commences operating, the plunger is rendered unattractive to the magnet and the coil attracts and maintains the armature restrained until the motor comes up to speed.

For a better understanding of my invention, reference may be had to the accompanying drawing in which.

Figure 1:
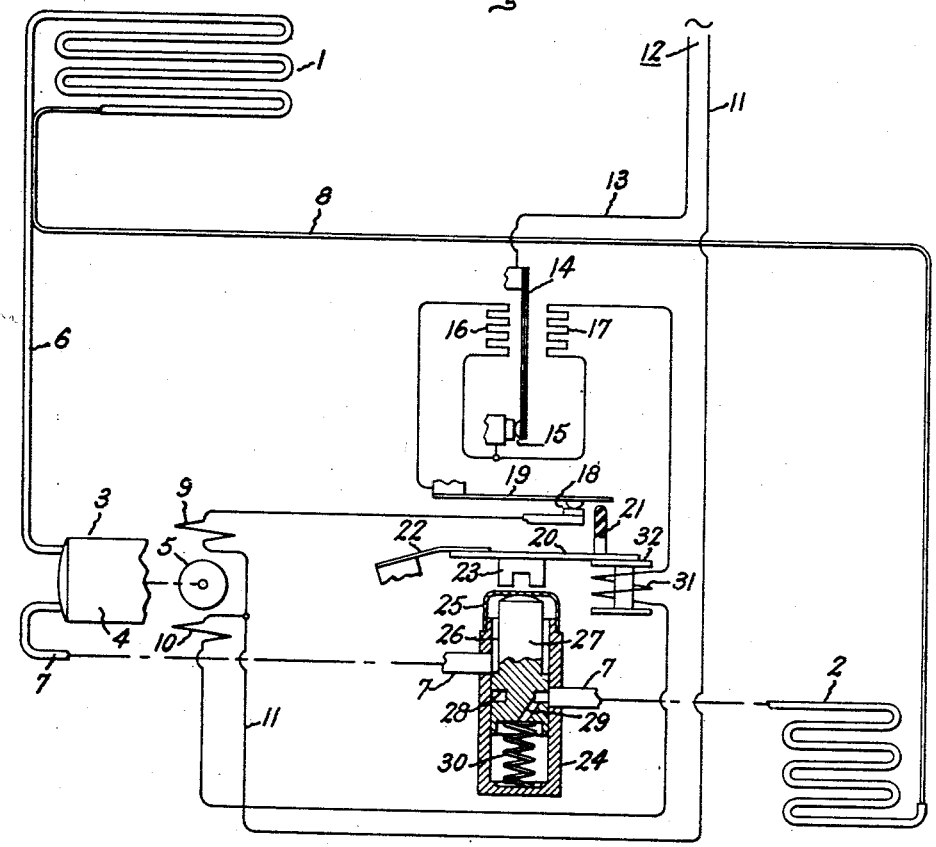
Fig. 1 is a schematic showing of a refrigerating system incorporating a preferred embodiment of my invention.

Referring now to the drawing, I have shown in Fig. 1 a refrigerating system including an evaporator 1, a condenser 2 and a refrigerating unit 3. The refrigerating unit 3 comprises a hermetically sealed case 4 housing a refrigerant compressor (not shown) and a compressor drive motor generally indicated at 5. The refrigerating unit 3 exhausts vaporous refrigerant from the evaporator 1 through a suction line 6 and delivers hot compressed vaporous refrigerant to the condenser 2 through a conduit 7. The hot compressed refrigerant is cooled and liquefied in the condenser 2 from which it is delivered through a capillary tube 8, a portion of which is placed in heat exchange relationship with the suction line 6, to the evaporator 1.

The motor 5 includes a starting winding 9 and a running winding 10, both of which are connected to a common lead 11 in a suitable current supply circuit generally designated 12. Provided for being connected to another lead 13 in the supply circuit 12 is a bimetallic overload strip 14 controlling a pair of overload contacts 15.

The overload contacts 15 which comprise a stationary contact and a movable contact carried by the overload strip 14 are adapted for protecting both the starting winding 9 and the running winding 10. This protection is afforded by a first or starting winding resistance heater 16 adapted for being connected between the stationary one of the overload contacts 15 and the starting winding 9 and a second or running winding resistance heater 17 adapted for being connected between the stationary one of the overload contacts 15 and the running winding 10. The heaters 16 and 17 straddle the overload strip 14 and heat the strip as a function of current flowing through the motor. At less than a predetermined high temperature, the bimetallic overload strip 14 maintains the overload contacts 15 closed. If, however, the motor 5 is energized and fails to attain operating speed within a predetermined starting period, the heat generated by both the first heater 16 and the second heater 17 becomes sufficient to heat the overload strip 14 to the above-mentioned predetermined high temperature whereby the strip 14 is flexed for opening the overload contacts 15 and thereby interrupting the current supply to the motor. Thus, the motor 5 is protected from overheating.

Figure 2:
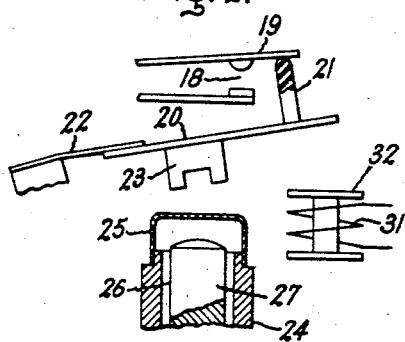
Fig. 2 is a fragmentary schematic detail view illustrating the armature opening the starting contacts.

Also connected in series with the first heater 16 and the starting winding 9 is a pair of starting contacts 18. One of the starting contacts 18 is stationary and the other is mounted on a resilient contact arm 19 whereby the starting contacts are biased closed for completing a circuit through the starting winding 9. Provided for controlling the starting contacts 18 is an arm or armature 20 formed of a magnetic material. The armature 20 carries an insulative finger 21 adapted for being engageable with the contact arm 19. A spring 22 biases the armature 20 to the position thereof shown in Fig. 2 in which position the finger 21 engages the contact arm 19 and opens the starting contacts 18.

Provided for restraining the armature 20 when the refrigerating unit 3 is idle and thereby insuring that the starting contacts 18 will be closed when a starting period commences is a flow switching arrangement including a permanent magnet 23 carried by the arm 20. The flow switching arrangement further includes a cylinder 24 disposed beneath the magnet 23 and connected in the refrigerant conduit 7 between the high pressure side of the refrigerating unit 3 and the condenser 2. Closing the upper end of the cylinder 24 and being in the field of attraction of the magnet 23 is a non-magnetic cap 25.

Provided for operating in the cylinder 24 and cooperating with the magnet 23 is a magnetic member or plunger 26. The plunger 26 is formed to include a reduced upper portion 27, an intermediate annular groove 28 and a bore 29 connecting the annular groove and the lower end of the plunger. The cylinder 24 is so connected in the conduit 7 that when the plunger is in the upper position thereof shown in Fig. 1, the plunger restricts communication between the refrigerating unit 3 and the condenser 2 and communication is established by the anular groove 28 and the bore 29 between the space between the lower end of the plunger and the cylinder and the portion of the conduit 7 connected directed to the condenser 2. When the plunger 26 is in a lower position the reduced portion 27 of the plunger affords unrestricted communication between the refrigerating unit and the condenser. A coil spring 30 disposed between the plunger 26 and the lower end of the cylinder 24 biases the plunger to its upper position in which position, in addition to restricting communication between the refrigerating unit and the condenser, the plunger is also in the concentrated field of attraction of the magnet 23 on the armature 20.

When the refrigerating unit is idle, the spring 30 is effective for maintaining the plunger 26 in its upper position. In this position, the plunger 26 is in the concentrated field of attraction of the magnet 23 and the magnet is attracted thereto for overcoming the spring 22 and thereby restraining the armature 20 from opening the starting contacts 18 with the finger 21. Thus, the starting contacts 18 are maintained closed when the refrigerating unit 4 is idle, thereby to insure that a circuit will be completed through the starting winding 9 of the motor 5 immediately upon commencement of a starting period.

When the starting period commences, refrigerant pressure builds up in the cylinder 24 about the reduced portion 27 of the plunger 26 until at a predetermined speed of the unit motor 5 the coil spring 30 is overcome and the plunger is actuated to its lower position in which it opens a passage from the refrigerating unit 3 to the condenser 2. This actuation of the plunger is facilitated by the annular groove 28 and the bore 29 which afford an escape for gas in the space between the lower end of the plunger and the cylinder.

Figure 3:
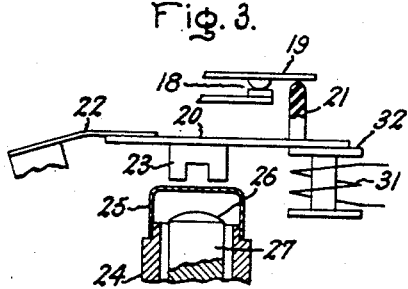
Fig. 3 is a fragmentary schematic detail view illustrating the armature restrained by the coil.

In its lower position, the plunger 26 is in a reduced field of attraction of the magnet 23 on the armature 20 and the magnet is rendered ineffective for further restraining the armature from opening the starting contacts 18 with the finger 21. In some refrigerating systems the unit motor will have attained a predetermined normal operating speed by the time the refrigerant pressure builds up sufficiently to overcome the coil spring 30 and actuate the plunger to its lower position. In other systems actuation of the plunger to its lower position results before the motor is able to attain operating speed. Provided for insuring that the armature 20 is continued restrained and the contacts 18 are maintained closed until the motor comes up to speed is a coil 31. The coil 31 is wound on a stationary core 32 and is connected in series with the second heater 17 and the running winding 10 of the motor 5. During starting of the motor 5 and until the motor attains normal operating speed, the current passing through the coil 31 energizes the coil sufficiently for attracting the armature 20 and restraining the armature in the manner shown in Fig. 3. Thus, the starting contacts 18 are maintained closed and the starting winding 9 is maintained energized until the motor 5 comes up to speed.

If, for any reason, the motor 5 fails to come up to speed within a predetermined starting period, the heat generated by both heaters 16 and 17 becomes sufficient for flexing the bimetallic overload strip 14 to open the overload contacts 15 and thereby break the current supply circuit 12. When the motor 5 does attain operating speed, the energization of the coil 31 becomes insufficient for restraining the armature 20 and the spring 22 actuates the armature to the position of Fig. 2 in which the insulative finger 21 carried by the armature engages the contact arm 19 and opens the starting contacts 18.

Following opening of the starting contacts 18 only the running winding 10 continues energized and a normal operating cycle of the refrigerating unit 3 is effected. Upon termination of each cycle of the refrigerating unit 3, the spring 30 biases the plunger 26 to its upper position in the concentrated field of attraction of the magnet 23 in which position it attracts the magnet downwardly to restrain the armature 20 from opening the starting contacts 18. Thus, the starting contacts are closed in anticipation of the succeeding starting period of the refrigerating unit.

It will be seen that my arrangement insures that the heater 16 in the starting winding of the refrigerating unit motor will be energized immediately upon commencement of a starting period and will be deenergized only after the motor comes up to operating speed. Thus, as with the second or running winding heater 17, the protection afforded by the first or starting winding heater 16 is obtained for the full duration of the starting period.

While I have shown and described a specific embodiment of my invention, I do not desire my invention to be limited to the particular form shown and described and I intend by the appended claims to cover all modificaitons within the spirit and scope of my invention.

What I claim as new and desire to secure by Letters Patent of the United States is:

1. The combination with a refrigerating unit including a motor having a starting winding circuit of means for controlling said starting winding circuit comprising; a pair of starting contacts in said starting winding circuit, said starting contacts being biased closed, an arm biased for opening said starting contacts, and means cooperating with said arm in accordance with operation of said refrigerating unit, said means restraining said arm from opening said starting contacts when said refrigerating unit is idle, said means being ineffective for restraining said arm when said unit motor attains a predetermined speed.

2. The combination with a refrigerating unit including a motor having a starting winding circuit of means for controlling said starting winding circuit comprising; a pair of starting contacts in said starting winding circuit, said starting contacts being biased closed, an arm biased for opening said starting contacts, a magnet carried by said arm, and a magnetic member cooperating with said magnet in accordance with the operation of said refrigerating unit, said magnetic member being attractive to said magnet and said magnet restraining said arm from opening said starting contacts when said unit is idle, said magnetic member being rendered unattractive to said magnet and said magnet being ineffective for restraining said arm when said unit motor attains a predetermined speed.

3. The combination with a refrigerating unit including a motor having a starting winding circuit of means for controlling said starting winding circuit comprising; a pair of starting contacts in said starting winding circuit, said starting contacts being biased closed, an arm biased for opening said starting contacts, a magnet carried by said arm, and a magnetic plunger adapted for being operated in accordance with the refrigerant pressure at the high pressure side of said refrigerating unit, said plunger assuming a position of attraction for said magnet and thereby rendering said magnet effective for restraining said arm from opening said starting contacts when said unit is idle, said plunger being actuated out of said position of attraction and said magnet being thereby rendered ineffective for restraining said arm when said unit motor attains a predetermined speed.

4. The combination with a refrigerating unit including a motor having a starting winding circuit of means for controlling said starting winding circuit comprising; a pair of starting contacts in said starting winding circuit, a resilient contact arm carrying one of said starting contacts and biasing said starting contacts closed, another resilient arm, an insulative finger carried by said last-mentioned arm, said last-mentioned arm being biased for overcoming said resilient contact arm and opening said starting contacts with said finger, a magnet carried by said last-mentioned arm, a cylinder connected to the high pressure side of said refrigerating unit, and a magnetic plunger in said cylinder, said plunger being biased to a position of attraction for said magnet, said plunger being in said position of attraction and said magnet restraining said arm from opening said starting contacts when said unit is idle, said plunger being actuated out of said position of attraction and said magnet being rendered ineffective for restraining said last-mentioned arm when said unit motor attains a predetermined speed.

5. The combination with a refrigerating unit including a motor having running and starting winding circuits in parallel across a supply circuit of means for controlling said motor comprising; a bimetallic overload strip adapted for opening said supply circuit at a predetermined temperature, a heater in each of said starting and running winding circuits, said heaters being adapted for heating said overload strip to said predetermined temperature when energized for more than a predetermined time, a pair of starting contacts in said starting winding circuit, said starting contacts being biased closed, an arm biased for opening said starting contacts, and means cooperating with said arm in accordance with operation of said refrigerating unit, said means restraining said arm from opening said starting contacts when said refrigerating unit is idle, said means being ineffective for restraining said arm when said unit motor attains a predetermined speed.

6. The combination with a refrigerating unit including a motor having running and starting winding circuits in parallel across a supply circuit of means for controlling said motor comprising; a bimetallic overload strip adapted for opening said supply circuit at a predetermined temperature, a heater in each of said starting and running winding circuits, said heaters being adapted for heating said overload strip to said predetermined temperature when energized for more than a predetermined time, a pair of starting contacts in said starting winding circuit, said starting contacts being biased closed, an arm biased for opening said starting contacts, a magnet carried by said arm, and a magnetic member cooperating with said magnet in accordance with the operation of said refrigerating unit, said magnetic member being attractive to said magnet and said magnet restraining said arm from opening said starting contacts when said unit is idle, said magnetic member being rendered unattractive to said magnet and said magnet being ineffective for restraining said arm when said unit motor attains a predetermined speed.

7. The combination with a refrigerating unit including a motor having running and starting winding circuits in parallel across a supply circuit of means for controlling said motor comprising; a bimetallic overload strip adapted for opening said supply circuit at a predetermined temperature, a heater in each of said starting and running winding circuits, said heater being adapted for heating said overload strip to said predetermined temperature when energized for more than a predetermined time, a pair of starting contacts in said starting winding circuit, said starting contacts being biased closed, an arm biased for opening said starting contacts, a magnet carried by said arm, and a magnetic plunger adapted for being operated in accordance with the refrigerant pressure at the high pressure side of said refrigerating unit, said plunger assuming a position of attraction for said magnet and thereby rendering said magnet effective for restraining said arm from opening said starting contacts when said unit is idle, said plunger being actuated out of said position of attraction and said magnet being thereby rendered ineffective for restraining said arm when said unit motor attains a predetermined speed.

8. The combination with a refrigerating unit including a motor having running and starting winding circuits in parallel across a supply circuit of means for controlling said motor comprising; a bimetallic overload strip adapted for opening said supply circuit at a predetermined temperature, a heater in each of said starting and running winding circuits, said heaters being adapted for heating said overload strip to said predetermined temperature when energized for more than a predetermined time, a pair of starting contacts in said starting winding circuit, a resilient contact arm carrying one of said starting contacts and biasing said starting contacts closed, another resilient arm, an insulative finger carried by said last-mentioned arm, said last-mentioned arm being biased for overcoming said resilient contact arm and opening said starting contacts with said finger, a magnet carried by said last-mentioned arm, a cylinder connected to the high pressure side of said refrigerating unit, and a magnetic plunger in said cylinder, said plunger being biased to a position of attraction for said magnet, said plunger being in said position of attraction and said magnet restraining said arm from opening said starting contacts when said unit is idle, said plunger being actuated out of said position of attraction and said magnet being rendered ineffective for restraining said last-mentioned arm when said unit motor attains a predetermined speed.

9. The combination with a refrigerating unit including a motor having running and starting winding circuits in parallel across a supply circuit of means for controlling said motor comprising; a bimetallic overload strip adapted for opening said supply circuit at a predetermined temperature, a heater in each of said starting and running winding circuits, said heaters being adapted for heating said overload strip to said predetermined temperature when energized for more than a predetermined time, a pair of starting contacts in said starting winding circuit, said starting contacts being biased closed, an armature biased for opening said starting contacts, means cooperating with said armature in accordance with operation of said refrigerating unit, said means restraining said armature from opening said starting contacts when said refrigerating unit is idle, said means being ineffective for restraining said armature when said refrigerating unit is operating, and a coil in said running winding circuit, said coil attracting and restraining said armature from opening said starting contacts after said refrigerating unit commences operating and until said motor comes up to speed.

10. The combination with a refrigerating unit including a motor having running and starting winding circuits in parallel across a supply circuit of means for controlling said motor comprising; a bimetallic overload strip adapted for opening said supply circuit at a predetermined temperature, a heater in each of said starting and running winding circuits, said heaters being adapted for heating said overload strip to said predetermined temperature when energized for more than a predetermined time, a pair of starting contacts in said starting winding circuit, said starting contacts being biased closed, an armature biased for opening said starting contacts, a magnet carried by said armature, a magnetic member cooperating with said magnet in accordance with the operation of said refrigerating unit, said magnetic member being attractive to said magnet and said magnet restraining said armature from opening said starting contacts when said unit is idle, said magnetic member being rendered unattractive to said magnet and said magnet being ineffective for restraining said armature when said unit is operating, and a coil in said running winding circuit, said coil attracting and restraining said armature from opening said starting contacts after said refrigerating unit commences operating and until said motor comes up to speed.

11. The combination with a refrigerating unit including a motor having running and starting winding circuits in parallel across a supply circuit of means for controlling said motor comprising; a bimetallic overload strip adapted for opening said supply circuit at a predetermined temperature, a heater in each of said starting and running winding circuits, said heaters being adapted for heating said overload strip to said predetermined temperature when energized for more than a predetermined time, a pair of starting contacts in said starting winding circuit, said starting contacts being biased closed, an armature biased for opening said starting contacts, a magnet carried by said armature, a cylinder connected to the high pressure side of said refrigerating unit, a magnetic plunger in said cylinder, said plunger being adapted to assume a position of attraction for said magnet and thereby render said magnet effective for restraining said armature from opening said starting contacts when said unit is idle, said plunger being actuated out of said position of attraction and said magnet being thereby rendered ineffective for restraining said armature when said unit is operating, and a coil in said running winding circuit, said coil attracting and restraining said armature from opening said starting contacts after said refrigerating unit commences operating and until said motor comes up to speed.

12. The combination with a refrigerating unit including a motor having running and starting winding circuits in parallel across a supply circuit of means for controlling said motor comprising; a bimetallic overload strip adapted for opening said supply circuit at a predetermined temperature, a heater in each of said starting and running winding circuits, said heaters being adapted for heating said overload strip to said predetermined temperature when energized for more than a predetermined time, a pair of starting contacts in said starting winding circuit, a resilient contact arm carrying one of said starting contacts and biasing said starting contacts closed, an armature, an insulative finger carried by said armature, said armature being biased for overcoming said resilient contact arm and opening said starting contacts with said finger, a magnet carried by said armature, a cylinder connected to the high pressure side of said refrigerating unit, a magnetic plunger in said cylinder, said plunger being biased to a position of attraction for said magnet, said plunger being in said position of attraction and said magnet restraining said armature from opening said starting contacts when said unit is idle, said plunger being actuated out of said position of attraction and said magnet being rendered ineffective for restraining said armature when said unit is operating, and a coil in said running winding circuit, said coil attracting and restraining said armature from opening said starting contacts after said refrigerating unit commences operating and until said motor comes up to speed.

13. In refrigeration apparatus including a refrigerating unit housing a motor having running and starting winding circuits in parallel across a supply circuit and overload protection means responsive to current flow through said starting and running winding circuits, a pair of starting contacts adapted for being connected in said starting winding circuit, said starting contacts being biased closed, an armature biased for opening said starting contacts, a magnet carried by said armature, a cylinder adapted for being connected to the high pressure side of said refrigerating unit, a magnetic plunger in said cylinder, said plunger being adapted to assume a position of attraction for said magnet and thereby render said magnet effective for restraining said armature from opening said starting contacts when said unit is idle, said plunger being actuated out of said position of attraction and said magnet being thereby rendered ineffective for restraining said armature when said unit is operating, and a coil adapted for being connected in said running winding circuit, said coil attracting and restraining said armature from opening said starting contacts after said refrigerating unit commences operating and until said motor comes up to speed.

14. In refrigeration apparatus including a refrigerating unit housing a motor having running and starting winding circuits in parallel across a supply circuit and overload protection means responsive to current flow through said starting and running winding circuits, a pair of starting contacts adapted for being connected in said starting winding circuit, a resilient contact arm carrying one of said starting contacts and biasing said starting contacts closed, an armature, an insulative finger carried by said armature, said armature being biased for overcoming said resilient contact arm and opening said starting contacts with said finger, a magnet carried by said armature, a cylinder adapted for being connected to the high pressure side of said refrigerating unit, a magnetic plunger in said cylinder, said plunger being biased to a position of attraction for said magnet, said plunger being in said position of attraction and rendering said magnet effective for restraining said armature from opening said starting contacts when said unit is idle, said plunger being actuated out of said position of attraction and thereby rendering said magnet ineffective for restraining said armature when said unit is operating, and a coil adapted for being connected in said running winding circuit, said coil attracting and restraining said armature from opening said starting contacts when said unit commences operating and until said motor comes up to speed.

15. In refrigeration apparatus including a refrigerating unit housing a motor having running and starting winding circuits in parallel across a supply circuit and overload protection means responsive to current flow through said starting and running winding circuits, a pair of starting contacts adapted for being connected in said starting winding circuit, a resilient contact arm carrying one of said starting contacts and biasing said starting contacts closed, an armature, an insulative finger carried by said armature, said armature being biased for overcoming said resilient contact arm and opening said starting contacts with said finger, a magnet carried by said armature, a cylinder adapted for being connected to the high pressure side of said refrigeration apparatus with one end of said cylinder in the field of attraction of said magnet, said one end of said cylinder being non-magnetic, a magnetic plunger in said cylinder, said plunger being biased toward said one end of said cylinder and into said field of attraction of said magnet, said plunger being in said field of attraction and said magnet being thereby rendered effective for restraining said armature from opening said starting contacts when said unit is idle, said plunger being actuated out of said field of attraction by refrigerant pressure and said magnet being thereby rendered ineffective for restraining said armature when said refrigerating unit commences operating, and a coil adapted for being connected in said running winding circuit, said coil attracting and restraining said armature from opening said starting contacts after said refrigerating unit commences operating and until said motor comes up to speed.

No references cited.